May 3, 1949.  G. E. FROST  2,468,743
PROTECTIVE SYSTEM
Filed Jan. 15, 1946  3 Sheets-Sheet 1

(a)

(b)

(c)

Inventor
GEORGE E. FROST
By
Attorney (a)

(b)

(c)

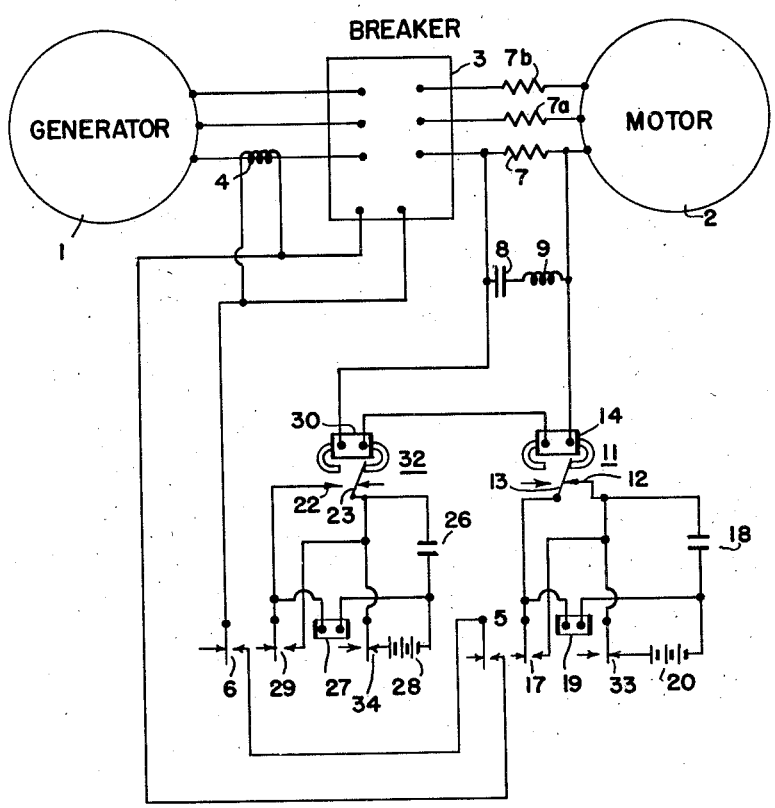

Patented May 3, 1949

2,468,743

UNITED STATES PATENT OFFICE 2,468,743

PROTECTIVE SYSTEM

George E. Frost, Schenectady, N. Y.

Application January 15, 1946, Serial No. 641,367

12 Claims. (Cl. 318—447)

(Granted under the act of March 3, 1883, as amended April 30, 1928; 370 O. G. 757)

My invention relates to electric systems and more particularly to methods of and means for protecting alternating current electric systems from the harmful effects incident to short circuit or motor stalling.

One of the principal problems associated with electric systems is that of providing means to prevent damage in the event of a short circuit, motor stall, etc. This is ordinarily accomplished by the use of circuit breakers having tripping mechanisms responsive to the abnormal conditions associated with these events. In general, these circuit breakers are made responsive to the magnitude and duration of current flow in the various circuits and disconnect the system when the combination of current and time exceeds predetermined values. This method has, however, a significant disadvantage for high currents over long periods of time may flow when system operation is normal. The circuit breaker tripping mechanism must then be set to a relatively high value in order to prevent false tripping. The resulting setting, however, is often so high that the circuit breaker will not operate on some fault current conditions. If several breakers must be arranged in cascade, this problem is particularly severe for the high setting of one breaker required to avoid false tripping raises the settings of the other breakers if selective tripping is to be achieved.

The above mentioned disadvantage of conventional circuit protective devices is particularly significant on small A.-C. systems such as those used aboard ship. In these systems, relatively large motors must be started with high starting torque, thereby requiring very large starting current as compared with the system and generator rating. In fact, the current flow during starting of a large motor on a system of this type often exceeds the current value under some types of short circuit conditions. Hence, the designer is faced with the choice of using a low circuit breaker setting and limiting his motor starting torque or using high circuit breaker setting and sacrificing short circuit protection.

I have discovered that the above mentioned disadvantages of conventional protective systems may be avoided by utilizing the inherent characteristics of current flow when motor starting takes place as compared with the current flow under fault conditions. I have found that when an induction or synchronous motor is started the normal transient D.-C. current component becomes an alternating current component having increased frequency and decreased magnitude as the motor comes up to speed. That is, at the instant the motor is applied to the circuit, a D.-C. current component flows but, when the motor commences to rotate, the current is reduced to zero and reverses in direction. As speed increases, the rate of change of this current, and the corresponding frequency, rises while the magnitude of the peak value in each direction decreases in accordance with the time constant of the circuit. This characteristic, that of a transient current decreasing in magnitude and increasing in frequency does not exist during short circuit or motor stalling. By causing circuit breaker action to be blocked when this alternating transient current component flows, I am enabled to prevent circuit breaker action while motors are being started and at the same time to allow circuit breaker action under faults or motor stalls which produce even smaller current values.

In accordance with one aspect of my invention, circuit breaker action is blocked during motor starting by the use of a system of relays responsive to the direction of the transient component of current flow. By providing one relay sensitive to current flow in one direction and a second relay sensitive to current flow in the opposite direction, I am enabled to block circuit breaker action whenever the direction of current flow of the transient component is changed. Inasmuch as the transient current component is a decaying D.-C. current under fault conditions and motor stalling, the circuit breaker remains effective during these conditions.

In accordance with another aspect of my invention, circuit breaker action is blocked during motor starting by means of a relay responsive to frequency. Inasmuch as the transient component of current flow during motor starting passes through a frequency range from that of direct current to that of a relatively high frequency alternating current, a frequency responsive system adapted to respond to a frequency within this range is effective in preventing circuit breaker action during motor starting. Fault conditions or motor stalling produce only a decaying D.-C. transient current component and do not actuate the relay, thereby permitting normal circuit breaker action.

system when an induction or synchronous motor is started.

Figure 3 shows a diagram of the connection of a circuit breaker to an electric system.

Figure 1:
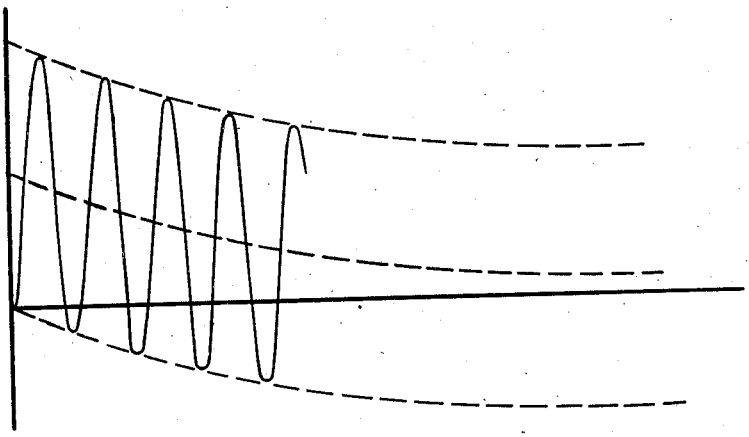
Figure 1 shows the current flow in an A.-C. system when a sudden short circuit or motor stall takes place.
Figure 1:
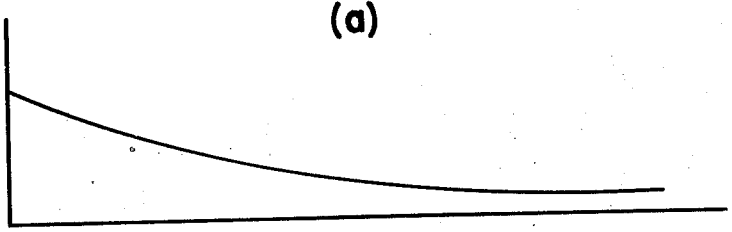
Figure 1:
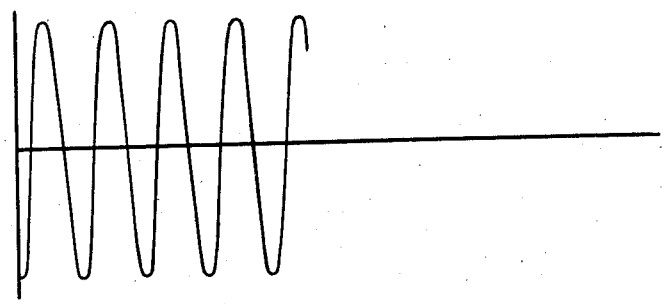

Referring now to Figure 1. When a sudden short circuit or other impedance change takes place on an A.-C. system, the A.-C. current must increase from a relatively low initial value to a new high value. Inasmuch as electric power circuits always contain some inductance, this current change cannot instantaneously take place. Consequently the A.-C. current is displaced from its steady state final position of symmetry with respect to the axis by an amount sufficient to cause the initial current change to be zero. This is shown in Figure 1 (a). From this initial value, the A.-C. current drops to the final steady state symmetrical condition with a time constant determined by the inductance and resistance in the circuit. It is therefore possible to resolve the complex current shown in Figure 1 (a) to two components, (1) a transient component which decays from a maximum value at the instant of current change to zero (Figure 1 (b)) and (2) an A.-C. component symmetrical with respect to the axis and undergoing no change with time (Figure 1 (c)).

Figure 2:
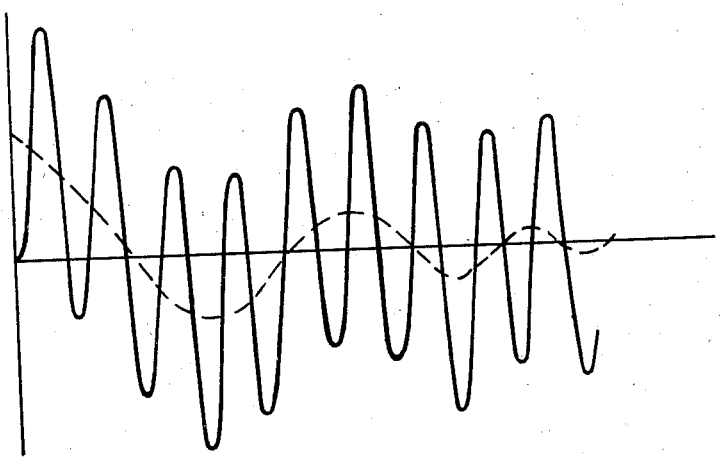
Figure 2 shows the current flow in an A.-C.
Figure 2:
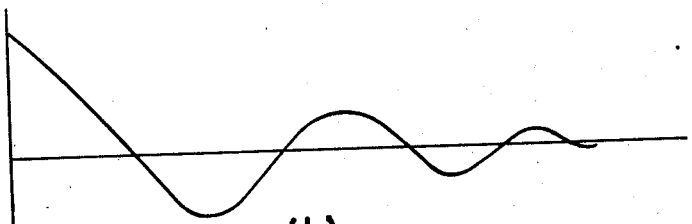
Figure 2:
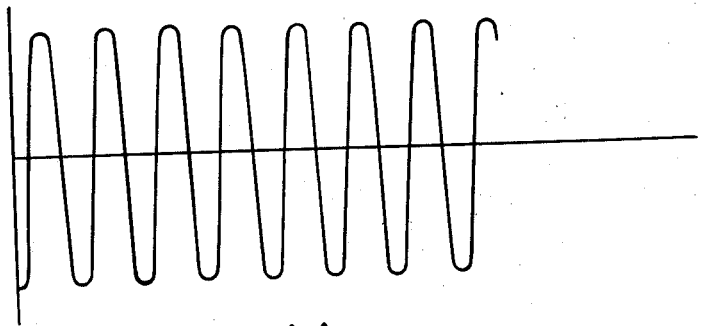

Figure 2 shows the changes in current flow when an induction or synchronous motor is started. Again, the current cannot instantaneously change and a transient current must exist at the instant of change. Hence, the current at the instant of starting is identical with that to be expected during a short circuit or other fault. However, the flux linkages which must remain constant and which prevent instantaneous current changes include in part flux linkages in the rotor circuit of the motor itself, and, when the motor begins to rotate, the amount and sign of these flux linkages is changed. Hence, when the motor starts, the transient current component changes in accordance with the motion of the rotor and when the rotor has changed by an angle equal to one pole angle, the direction of transient current flow is reversed. Inasmuch as the rapidity with which the motor passes from one pole position to another varies as the motor comes up to speed, the frequency at which the transient current component reverses itself increases as time goes on. This is shown in Figure 2. As shown in Figure 2 (b), the transient current component consists of a damped sine wave continually increasing in frequency. The A.-C. current component shown in Figure 2 (c) is identical with the case of a fault as shown in Figure 1 and undergoes no change with time.

In accordance with my invention, I detect the presence of the transient current component shown in Figure 2 (b) and utilize this current component for the purpose of preventing circuit breaker action. This current component may be detected either by a filter sensitive to current of frequency corresponding to a frequency existing in the transient current component or by the use of a device sensitive to the reversal of direction of transient current flow.

Figure 3 shows how my invention may be applied to a typical protective system. In the figure, 1 is an alternating current generator, 2 is an alternating current motor which may be either of the induction or synchronous type and 3 is a circuit breaker connected between the motor and generator. The purpose of circuit breaker 3 is to disconnect the circuits associated with motor 2 from the generator when it is desired to do so or when a fault takes place or the motor stalls. Circuit breaker 3 is actuated by a trip mechanism which derives its operating current from current transformer 4 so that the current flow in the circuit breaker operating mechanism is proportional to the current flow in the circuit from generator 1.

In order to prevent circuit breaker action when current flow in excess of the circuit breaker setting takes place, an auxiliary current path is provided which shunts the circuit breaker operating mechanism. This circuit comprises contacts 5 and 6, Figure 3. When these two contacts are closed, current from current transformer 4 passes through the series circuit containing these contacts and no current flows through the circuit breaker operating mechanism. Hence, by closing contacts 5 and 6 I am enabled to block normal circuit breaker action.

A specific circuit whereby contacts 5 and 6 may be closed during motor starting is shown in Figure 3. In the figure, 7 is a resistance disposed in the current path of the circuit breaker. Condenser 8 and inductance 9 are in series relation and resonate at the system frequency, thereby reducing the impedance across resistance 7 at the system frequency to a very low value. Polarized relays 11 and 32 are disposed in series relationship across resistance 7. Relay 11 closes contacts 12 and 13 when current flow in coil 14 is in one direction and relay 32 closes contacts 22 and 23 when current flow in coil 30 is in the opposite direction. Condenser 18 is connected to be charged by direct voltage source 20 and to be connected in series with the coil of relay 19 when contacts 12 and 13 or contact 17 close. Relay 19 closes contacts 5 and contacts 17 and opens contacts 33 upon current flow through the coil portion thereof.

Condenser 26 is connected to be charged by direct voltage source 28 when contacts 34 are closed and is adapted to be discharged through the coil of relay 27 when contacts 22 and 23 or contacts 29 close. Relay 27 closes contacts 6 and 29 and opens contacts 34 when current from condenser 26 flows through the coil portion thereof.

In the construction of my device as shown in Figure 3, the relay 11 is designed to close contacts 12 and 13 when current flow in coil 14 is in one direction and relay 32 is designed to close contacts 22 and 23 when current flow in coil 30 is in the opposite direction. This may be done, for example, by mounting contacts 13 and 23 on permanent magnets of opposite polarities relative to the directions of current flow in coils 14 and 30. It will, of course, be evident that other arrangements may be used to accomplish this performance.

Operation of my device as shown in Figure 3 is as follows. When an induction or synchronous motor is started, a large A.-C. current of fundamental power system frequency flows. This current passes through resonant circuit 8—9 and produces no voltage drop across resistance 7. Therefore no system frequency current flows through coils 14 and 30. The transient component of current flow associated with the motor starting current, however, flows through coils 14 and 30 because it is not of system frequency. The initial transient current flow will either cause polarized relay 11 to close or polarized relay 32 to close. Assuming for the moment that the direction of the transient component is such as to close relay 11, contacts 12 and 13 will be closed. When contacts 12 and 13 close, condenser 18 discharges through relay 19, thereby closing contacts 5 and 17 and opening contacts 33. When contact 17 closes, current flow is permitted through coil 19 even though polarized relay 11 returns to its previous position due to a change in the transient component of motor starting current. In addition to closing contacts 5 and 17, current flow through relay 19 opens contact 33. Hence, when relay 11 returns to its previous position due to a decrease in the D.-C. current, closed contact 17 will provide a path for current flow from condenser 18 through coil 19 and open contact 33 will prevent current flow from battery 20 to condenser 18. Therefore, condenser 18 will hold contacts 5 and 17 closed until the current flow from the condenser reaches a value which permits these contacts to open. At that time opening of contacts 5 and 17 and closing of contacts 33 will take place and the system restored to its initial condition.

As shown in Figure 2, the direction of the transient current changes in a short period of time after motor starting. Hence, if the initial current causes polarized relay 11 to close, the reverse current will cause polarized relay 32 to close. This will close contacts 22 and 23. Condenser 26 will thereupon discharge through contacts 22 and 23 and relay 27, thereby closing contacts 6 and 29 and opening contact 34. When this takes place current will flow through contacts 29 and relay 27 until the charge in condenser 26 is lost. This current will hold contact 6 in the closed position and, since contact 5 has been previously closed by the initial transient current, the current from current transformer 4 will flow through these contacts rather than the circuit breaker trip mechanism. This condition will continue so long as condensers 18 and 26 remain charged.

In the event that a fault takes place or the motor stalls, the transient current will always have the same polarity as shown in Figure 1(b). In this case, either polarized relay 11 or polarized relay 32 will close, thus causing either contacts 5 or contacts 6 ultimately to be closed. In either event, only one contact is closed and the full current from current transformer 4 passes through the circuit breaker trip mechanism. The current is therefore effective in tripping the circuit breaker and disconnecting generator 1 from motor 2.

In order to provide an adequate time period during which condensers 18 and 26 will hold contacts 5 and 6 closed, I use values of capacitance, resistance, and inductance in the circuit of these condensers such that the relay will be held closed until the critical current period is passed. In general, I prefer to use values of these elements which cause the current transient to be slightly over damped in order that oscillation or chattering may be avoided.

In general, I use devices such as those shown in Figure 3 equal in number to the number of phases of the electric system involved. That is, an additional resistance (7a, 7b, Figure 3) is located in each phase wire and connected to polarized relays like resistance 7. This is desirable because motor starting occurs at random instants in the cycle of alternating current and it is possible for the motor to be applied at an instant when no D.-C. transient current is produced in one particular phase. By connecting the devices to each phase, this problem is prevented because at least one phase is certain to have a significant D.-C. current component.

While this invention is susceptible of various modifications and alternative constructions, I have shown in the drawings and have herein described in detail only the preferred embodiments. It is to be understood, however, that I do not intend to limit the invention by such disclosure for I aim to cover all modifications and alternative construction falling within the spirit and scope of the invention as defined in the appended claims.

The invention described herein may be made and used by or for the Government of the United States for governmental purposes without payment to me of any royalties thereon or therefor.

What is claimed is:

1. In an electric system, a generator of alternating electromotive force, a utilization circuit including a dynamo electric machine connected to said generator to derive energy therefrom, a disconnecting device interposed in circuit relationship with said generator and said circuit, elements to open said disconnecting device on predetermined current flow therethrough to disconnect said generator and said circuit, and relay mechanism responsive to low frequency components of current flow through said device to block operation of said elements and prevent accidental opening of said device upon starting said machine.

2. In an electric system, a generator of alternating electromotive force, a utilization circuit including at least one dynamo electric machine connected to said generator to derive energy therefrom, a disconnecting device interposed in circuit relationship with said generator and said circuit, elements to open said disconnecting device on predetermined current flow therethrough to disconnect said generator and said circuit, and a relay mechanism responsive to low frequency components of current flow through said device to block operation of said elements for a predetermined time after a low frequency current flow and prevent opening of said device upon starting said machine.

3. In an electric system, a generator of alternating electromotive force, a utilization circuit including at least one dynamo electric machine connected to said generator to derive energy therefrom, a disconnecting device interposed in circuit relationship with said generator and said circuit, elements to open said disconnecting device upon predetermined current flow therethrough to disconnect said generator and said circuit, and a relay mechanism responsive to change in polarity of the low frequency components of current flow through said device to block operation of said elements and prevent opening of said device upon starting said machine.

4. In an electric system, a generator of alternating electromotive force, a utilization circuit including at least one dynamo electric machine connected to said generator to derive energy therefrom, a disconnecting device interposed in circuit relationship with said generator and said circuit, elements to open said disconnecting device upon predetermined current flow therethrough to disconnect said generator and said circuit, and a relay mechanism responsive to change in polarity of the low frequency components of current flow through said device to block operation of said elements for a predetermined time after a low frequency current flow and prevent opening of said device upon starting said machine.

5. In an electric system, a generator of alternating electromotive force, a utilization circuit including at least one dynamo electric machine connected to said generator to derive energy therefrom, a disconnecting device interposed in circuit relationship with said generator and said circuit, elements responsive to current flow through said device to open said device upon predetermined current flow therethrough to disconnect said generator and said circuit, a pair of polarized relays each having an operating winding and a pair of contacts which are actuated by a transient component of current flow in one direction through said winding, elements connecting said windings of said relays to carry current determined by the current flow through said device, and elements connecting the contacts of said relays to said first elements to render said first elements ineffective when the contacts of both of said relays are in the actuated condition, whereby said device is rendered ineffective during starting of said machine.

6. In an electric system, a generator of alternating electromotive force, a utilization circuit including at least one dynamo electric machine connected to said generator to derive energy therefrom, a disconnecting device interposed in circuit relationship with said generator and said circuit, elements responsive to current flow through said device to open said device upon predetermined current flow therethrough to disconnect said generator and said circuit, a pair of polarized relays each having an operating winding and a pair of contacts which are actuated for a predetermined time after a transient component of current flows in a predetermined direction therethrough, elements connecting said windings of said relays to carry current determined by the current flow through said device, and elements connecting the contacts of said relays to said first elements to render ineffective said first elements when the contacts of both of said relays are in the actuated condition, whereby said device is rendered ineffective during starting of said machine.

7. In an electric system, a generator of alternating electromotive force, a utilization circuit including at least one dynamo electric machine connected to said generator to derive energy therefrom, a disconnecting device interposed in circuit relationship with said generator and said circuit, elements responsive to the current flow through said device to open said device upon predetermined current flow therethrough to disconnect said generator and said circuit, and a pair of switches each having an open condition and a closed condition connected in series relationship across said elements to prevent energy flow therethrough when simultaneously in the closed position condition, a relay mechanism responsive to a transient component of current flow in one direction through said device to close one of said switches for a predetermined time after said current flow, and a relay mechanism responsive to a transient component of current flow in the opposite direction through said device to close the other of said switches for a predetermined time after said current flow, whereby said device is rendered ineffective during starting of said machine.

8. A mechanism for use in electric circuits of the type having an alternating current source, a load connected to said source and including a dynamoelectric machine, and a circuit protective device interposed between said source and said load, said device being of the type wherein elements sensitive to current flow between said source and said load are actuated upon predetermined current flow therebetween to disconnect said source and said load; said mechanism comprising a relay responsive to the flow of low frequency transient current components between said source and said load and operable to render said elements inoperative upon flow of said currents to prevent operation of said device.

9. A mechanism for use in electric circuits of the type having an alternating current source, a load connected to said source and including a dynamoelectric machine, and a circuit protective device interposed between said source and said load, said device being of the type wherein said load is automatically disconnected from said source when predetermined current flows therebetween and having a pair of conducting elements that prevent said automatic operation when connected together; said mechanism comprising a relay responsive to the flow of low frequency currents between said source and said load and operable to connect said elements upon flow of said currents to render said device inoperative when said machine is started.

10. A mechanism for use in electric circuits of the type having an alternating current source, a load connected to said source and including at least one dynamoelectric machine, and a circuit protective device interposed between said source and said load, said device being of the type wherein said load is automatically disconnected from said source when predetermined current flows therebetween and having a pair of conducting elements that prevent said automatic operation when connected together; said mechanism comprising a relay responsive to the change in direction of the transient component of current flow between said machine and said device and operable to connect said elements upon said change in direction to render said device inoperative when said machine is started.

11. A mechanism for use in electric circuits of the type having an alternating current source, a load connected to said source and including at least one dynamoelectric machine, and a circuit protective device interposed between said source and said load, said device being of the type wherein said load is automatically disconnected from said source when predetermined current flows therebetween and having a pair of conducting elements that prevent said automatic operation when connected together; said mechanism comprising a pair of relays having normally open contact elements connected in series connection across said pair of conducting elements, one of said relays being responsive to transient current flow in one direction between said source and said load and one operable to close its contact elements upon flow of said current in said direction and the other of said relays being responsive to transient current flow in the other direction between said source and said load and operable to close its contact elements upon flow of said current in said other direction.

12. A mechanism for use in electric circuits of the type having an alternating current source, a load connected to said source and including at least one dynamoelectric machine, and a circuit protective device interposed between said source and said load, said device being of the type wherein said load is automatically disconnected from said source when predetermined current flows therebetween and having a pair of conducting elements that prevent said automatic operation when connected together; said mechanism comprising a pair of relays each having a pair of normally open contact elements, conducting elements connecting said contact elements in series relationship across said first pair of conducting elements, one of said relays being operable to close its contact elements for a predetermined time after flow of transient current in one direction between said machine and said load and the other of said relays being operable to close its contact elements for a predetermined time after flow of transient current in the opposite direction between said machine and said load.

GEORGE E. FROST.

REFERENCES CITED

The following references are of record in the file of this patent:

UNITED STATES PATENTS

| Number | Name | Date |
|---|---|---|
| 1,877,454 | Goldsborough | Sept. 13, 1932 |
| 1,927,794 | Fallou | Sept. 19, 1933 |
| 2,151,161 | Seeley | Mar. 21, 1939 |
| 2,290,101 | Gutmann | July 14, 1942 |
| 2,303,133 | Neher | Nov. 24, 1942 |
| 2,316,289 | Sandstrom | Apr. 13, 1943 |